April 23, 1968   E. R. BILLINGTON   3,379,213
EXCESS FLOW CHECK VALVE
Filed Jan. 12, 1966

INVENTOR.
EVANS R. BILLINGTON
BY
*Graham D. Harbaugh*
ATT'Y

United States Patent Office 3,379,213
Patented Apr. 23, 1968

3,379,213
EXCESS FLOW CHECK VALVE
Evans R. Billington, Glenview, Ill., assignor to The Bastian Blessing Company, Chicago, Ill., a corporation of Illinois
Filed Jan. 12, 1966, Ser. No. 520,143
13 Claims. (Cl. 137—515.5)

This invention relates to excess flow check valves for use in liquefied petroleum gas handling equipment and more particularly to an excess flow check valve adapted for use in safeguarding the eduction of liquid from a storage tank under a vapor gauge pressure present in the tank, same being a modification of the constructions shown in my Patent No. 3,095,899, issued July 2, 1963, in that major obstructions, particularly spiders and flow turbulating structures causing molecular heat impact bubbling are eliminated downstream of the excess flow check valve. Reference is hereby made to said patent for further explanation.

Excess flow check valves are generally used as automatic outflow check or cut-off valves in fluid eduction conduits of liquefied petroleum gas dispensing systems as a safety precaution to prevent the dangerous escape of gas in event a break occurs in a service conduit beyond the valve. Accordingly, the valve is located in a valve body attached to the tank and because of competitive emphasis upon economy and minimum sizes difficulty is experienced in withdrawing liquid at a heavy rate satisfactory for filling tractor tanks without closing the conventional excess flow check valve that is set to protect against a dangerous break in the conduit.

In view of this, it is one of the objects of the invention to provide an improved self opening excess flow check valve construction which is locked and sealed in its closed position when not in service, can be safely and readily unlocked and placed in service without escape of gas, and with respect to a conventional valve of comparable pipe size provides greater flow capacity in filling auxiliary fuel tanks with an increased sensitivity.

The invention is characterized by a maximum flow area throughout the valve body of an excess flow check valve for a given pipe size without flow inhibiting obstructions and flow turbulating elements that lessen the flow rate below that of the valve itself at a high rate of flow.

The invention also greatly minimizes any flow obstruction or turbulence which would detract from or reduce the sensitivity and responsiveness of a high capacity excess flow check valve to excess flow occurring in a liquid eduction conduit leading from a storage tank.

Other objects and advantages of the invention will become apparent, including not only improved construction, operation and results accomplished but also, a less expensive and more profitable product to produce which is easy to assemble and service and rugged against abuse with some resiliency in supporting the moving parts against binding and damage.

In the drawings, where like numerals refer to like parts:

It will be appreciated that given a particular inside pipe diameter for a particular flow rate of liquid therethrough, elements lying in the path of flow generally constitute obstructions which affect the flow potential by reducing the flow area and also increasing turbulence. Where an excess flow check valve is concerned its responsiveness is adversely affected thereby. The critical and most effective flow modification should be at the valve itself exclusively.

With an ever increasing desire for higher flow rates for any given pipe size, obstructions and turbulence present in the flow of conventional excess flow check valves reduce their reliability to respond to dangerous breaks when set for maximum working flows. Moreover, other factors and variables increasingly cause false closings as where a storage tank gauge pressure may be quite high and that of an auxiliary tank being filled thereby quite low.

The maximum flow through a valve body is related to how much liquid can pass around the valve element and through the valve port at any given pressure differential and then a spring urging the check valve to its open position is selected which will permit the valve to snap closed at some rate above that which is considered to be indicative of a safe withdrawal. Flow obstructions and turbulence in a valve body, particularly downstream of the valve port, and other than that provided at the valve port detract from the drop across the valve element and the sensitivity of the valve. The maximum flow rate which can be considered safely permissive which would not be the result of a dangerous break in the conduit has to be appraised and connected downwardly accordingly.

As compared with conventional excess flow check valves having spider-like crosswalls supporting a valve stem, in the present invention the flow passage within the valve body is wide open throughout its length except for the cross-sectional area of the valve stem required for operating the valve and a sleeve-like guide therefor that is supported by a wire element located at the main spring support shoulder well away from the valve port and where the passage can be the largest with little if any flow area reduction. The spiders of conventional valves located in close proximity to the valve port cause turbulence immediately downstream of the valve port itself and materially affect the effective excess flow pressure drop across the valve.

Figure 1:
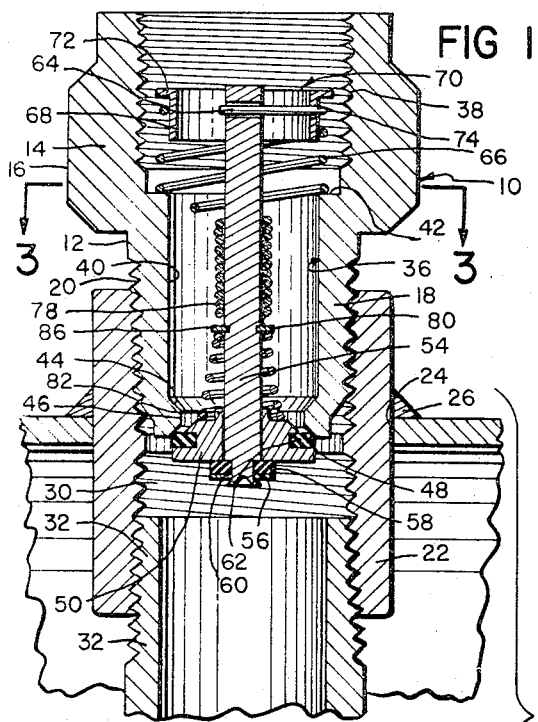
FIG. 1 is a vertical sectional view showing an excess flow check valve embodying the invention as used on a storage tank and ready for connecting a service conduit thereto.

Referring now to the drawing and FIG. 1 in further detail, it will be observed that the valve body 12 of the valve 10 embodying the invention is elongated. It has a head 14 with an external wrenching configuration 16 at one end and a reduced end portion 18 at the other end taper threaded at 20 for acceptance in a pipe coupling 22 that is welded as at 26 in place in an opening 24 of a storage tank 28. This coupling is representative of other pipe elements and conduits whose size determines the flow or differential area of the conduit 30 remaining around the peripheral edge of the valve element. The invention is used for liquid eduction applications and a coupling such as coupling 22 which supports a pipe 32 extending to the bottom 34 of the tank 28. The relative sizes of these parts as assembled is shown in FIG. 1.

Figure 2:
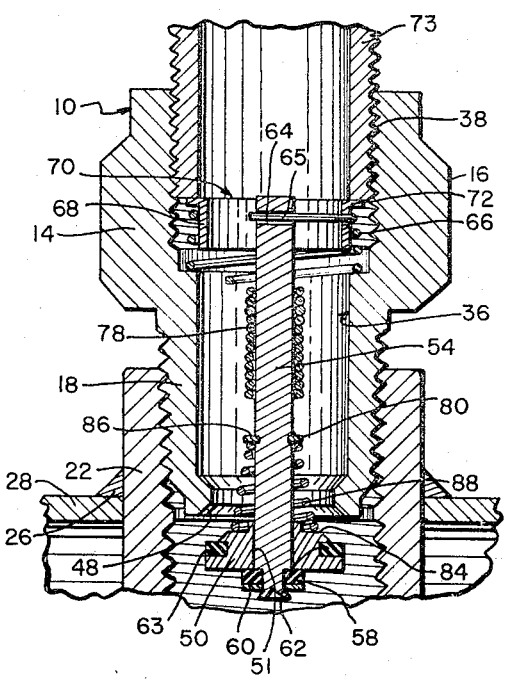
FIG. 2 is a partial copy of the view in FIG. 1 showing the embodiment with a service conduit connected thereto ready for withdrawal of liquid from the tank.
Figure 3:
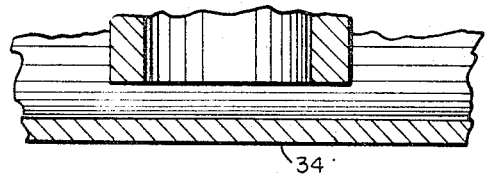
FIG. 3 is a cross-sectional view taken upon line 3—3 in FIG. 1.
Figure 3:
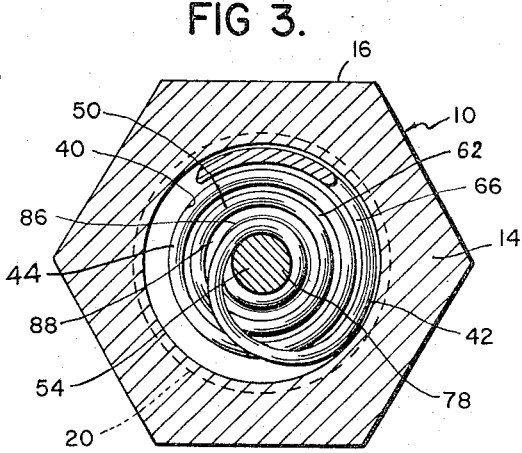

The body has a passage 36 which can be, and as shown in FIG. 1, is enlarged and internally threaded at its outlet 38 to receive a connection 73 (FIG. 2). Deeper within the enlarged head portion the passage 36 is of a size reduced sufficiently as at 40 to provide an outwardly facing shoulder 42 and an inner passage of a size equal to or larger than the valve port 46. In FIG. 1 the inner end of this passage is further reduced as at 44 to provide adequate stock for a valve port opening 46 that terminates in a conical valve seat 48 located within the coupling. In this embodiment the passage is bored and threaded from the outlet end in single operations.

Figure 4:
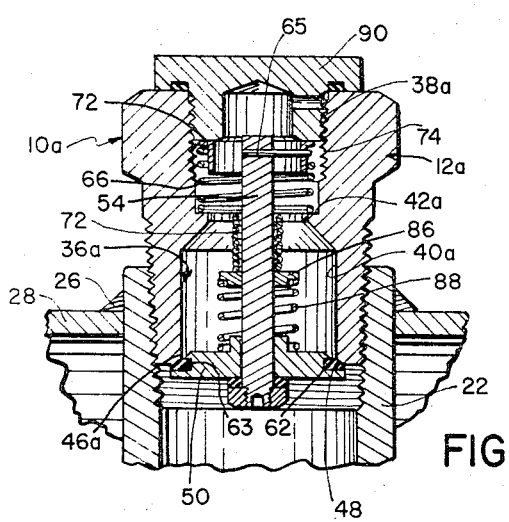
FIG. 4 is a vertical sectional view similar to FIG. 1 showing another embodiment of the invention but with the protective cap thereon employed when excess flow check valves embodying the invention are not being used.

At this time, it may be well to note the shape of the passage 36a in FIG. 4 wherein the over all diameter of the body 12a is approximately the same. This enables the inner or valve end portion 40a of the passage 36a to be bored out in one operation much larger than the opening through the shoulder 42a whereby a large full open space is provided for a greater valve sensitivity within the limits of the body stock that is required for the strength of the side wall of the passage.

From the description this far it will be observed how the manufacture procedure and costs are greatly reduced over a body provided with a spider in the passage to the valve port as provided in previous valves of a similar character. Besides the spider material that required extra machining operations can be converted to profitable metal scrap.

Referring to FIGS. 1, 2 and 4, the valve members 50 are marginally provided with a resilient seat disc 62 carried in a peripheral groove 63. The valve element is preferably located beyond the end of the body 12 where it closes against the valve seat 48 in the direction of expected flow of liquid therethrough. The valve member is centrally apertured to receive in slidable relationship therethrough the inner end of a valve stem 54 with sufficient clearance 51 therebetween to provide a bleed passage adequate to equalize pressures on opposite sides of the valve element within a brief period of time is closed.

The valve stem extends beyond the valve member where it is of reduced size as at 56 to receive a resilient washer 58 which overlaps and seals the space between the stem and valve member when in mutual contact therewith. The washer 58 is held in place under mild compression by a metal washer 60 secured in place by the exposed end of the stem being staked or peened over after the assembly thereof. Thus, the resilient washer 58 operates as a valve to open and close the bleed clearance between the stem and valve and also provide limited freedom for the valve member to adjust and seat itself against the taper of the valve seat 48.

The outer end of the stem extends to within the threaded opening 38 where it is cross drilled as at 64 to receive the outer end 65 of a comparatively strong coiled spring 66 which terminates in a radial direction after it is received through the cylindrical portion 68 of a grommet 70 having a radial portion 72 that overhangs the outer coil 74 of the spring. The coils of the outer portion of the spring 66 follow closely the threaded wall 38 and engage on the shoulder 42 in supported relationship while the radial portion 72 of the grommet serves as a bearing for the end of the connection 73 (FIG. 2) which, when threaded into place, displaces the grommet 70 to compress the spring 66 and through spring end drive the valve stem 54 inwardly to free the valve member 50 of the closing restraint of the spring 66.

In the making of the spring 66, the spring wire after forming the coils 74 above the shoulder 42 is coiled to a reduced diameter with the smaller coils 78 disposed coaxially with the passage 36, and arranged substantially solid to receive the mid-portion of the stem 54 in slidably guided relationship under an easily maintained tolerance of a few thousandths of an inch, leaving the rest of the space around the stem open for unobstructed flow of educted liquid.

The lower end of the smaller coils 78 terminate at 80 an appreciable distance from the valve member, which upon its downstream side is provided centrally with an axial guide flange 82 surrounded by an annular planar surface 84. A spacer 86 in the form of a washer is disposed on the stem at the lower end of the small guide turns 78 and between it and the planar surface a comparatively weak compression spring 88 is disposed under tension whereby as the stem 54 moves to permit the valve member 50 to open when pressure is equalized sufficiently on opposite sides thereof, the spring 88 urges the valve members to its open position and thereafter serves as the excess flow responsive agent provided with a remaining compression factor at which the valve will be permitted to close under varying flow rate conditions.

In the normal operation of the valve, the parts will assume the positions shown in FIG. 2 with the stronger spring 66 connected to the stem 54 holding the valve closed against the opening bias of the weaker spring 88. However, when an outlet connection, as for example, a pipe 73 (FIG. 2) is threaded into the threaded discharge opening 38 of the head 14, it will engage the grommet 70 and positively compress the stronger spring 66 and at the same time shift the stem 54 inwardly to allow the weaker spring to urge the valve member inwardly. As soon as the pressure on both sides of the valve becomes equalized within seconds, the valve member opens and permits liquid to flow any time thereafter. However, if due to breakage of the pipe 73 or for some other reason, the flow would become excessive and significant drop in pressure occur on the outlet side of the valve accompanied by a rush of liquid through the valve, the valve will compress the weaker spring and close. The stronger spring 66 still is held in its compressed condition by the end of the pipe 73. Allowing the valve to close thus cuts off the flow and prevents waste of or damage by the escaping fluid. The valve member will open again automatically when pressures on opposite sides are again equalized through the bleed passage.

When it becomes desirable to disconnect the pipe 73 its removal will release the strong spring 66 and the valve member 50 will be pulled shut before the threaded relationship is completely relinquished and any residual gas pressure in the pipe 73 will be released before severance. In order to close the outlet end of the head 14 when a conduit such as pipe 73 is not connected thereto a plug 90 is provided, as shown in FIG. 4.

In performing the operations outlined, it is to be noted that the area of clearance between the edge of the valve member 50 and the wall of the coupling determines in part the restriction upon flow which builds up a dynamic pressure drop across the valve to cause it to close under flow rate conditions considered to be excessive or unsafe. Another part of the restriction imposed upon the rate flow is the flow area of the valve port which if greater allocates the significant pressure drop to the clearance between the edge of the valve member and the coupling wall where it may perform with the greatest reliability if there are no significant turbulence and obstructions beyond the valve port which would tend to reduce the pressure drop as well as a working flow and the flow significance of a break in the line. The embodiments shown are characterized by the absence of any obstructions to lineal immediately downstream of the valve port that would cause turbulence. Thereafter a flow rate area is provided in the system downstream of the valve which is substantially that for which the valve is set to allow for a high rate flow with safety.

Consequently, not only are the stated objects attained and turbulence downstream of the valve substantially eliminated by the absence of transversely disposed elements, except for approximately a one-half turn of the spring wire at the shoulder, but a smooth open conduit-like flow along the valve stem is attained whereby flow to and from the valve and valve port is lineal thereby providing a greater margin for proper response and excess flow control than heretofore attained for high rates of flow in conduits of like size. Further, large savings in production costs, including tools, machine time and inspection and assembly are attained with a simple clear boring operation with conventional drills and cutters with the tight winding of the stem guide on a spring winding automatic machine having rounded contours being presented to contact the flowing liquid.

It is to be noted in connection with FIG. 4 that with respect to the relative flow areas involved between the inner wall of the conduit 22 as determined from the radius of the thread and the periphery of the valve member 50 is less than the flow area of the valve port around the valve stem. This relationship enables the excess flow closing responsiveness of the valve to be related to a predetermined entrance area of a restricted flow portion irrespective of any excess opening movement that ought to be induced by a male coupling received in the threaded opening. The opposition of the spring 88 to the closing of the valve is also constant when its inner end is also controlled by the movement of the valve support stem.

Accordingly, it will be appreciated from the drawings and description how the inventive concept is utilized, and how various and further changes can be made without departing from the spirit of the invention, the scope of which is commensurate with the appended claims.

What is claimed is:

1. A check valve comprising a body having a passage therethrough defining a surface of revolution including a shoulder and a valve seat spaced from each other,
   a valve stem disposed axially in said passage,
   a valve member carried by said stem to engage said valve seat, and
   resilient means urging said valve stem to close said valve member against said valve seat comprising an integrally formed coiled spring having a resilient coiled portion resting at one end on said shoulder and actuating said valve stem at the other end to urge said valve stem to move said valve member in a predetermined direction with respect to the valve seat,
   said resilient coiled portion supporting as a unit therewith an alongated sleeve member coaxially in said surface of revolution which slidably receives said valve stem in guided relationship as the sole support for the valve stem in a radial direction in said passage.

2. The device defined in claim 1 in which said sleeve member comprises a plurality of closely spaced smaller coils integrally formed upon one of said ends of the resilient coiled portion.

3. In the device defined in claim 1 in which said valve member is slidable on said valve stem and including:
   a compression spring of less strength than said resilient coiled portion disposed between said valve member and said sleeve member under stress for urging said valve member in a direction opposite to said predetermined direction.

4. In the device defined in claim 1 in which the surface of revolution remote from said valve seat is internally threaded to receive a threaded end of a conduit connection to displace said other end of the resilient coiled portion inwardly to actuate said valve stem, and
   said valve stem extending through said valve seat to engage said valve member.

5. The check valve defined in claim 3 in which the compression spring of less strength engages at one end the valve member, and
   said valve stem has means thereon supporting the other end of said compression spring for its movement therewith.

6. The combination of the check valve defined in claim 5 in which said valve seat is located at one end of the passage with the valve member disposed beyond that end of the body, and
   conduit means surrounding said valve member to define with the periphery thereof an annular flow area therebetween approximately the same to less than the flow area of the valve port,
   said stress on the compression spring urging the valve to its open position being constant with respect to said annular flow area wherever said valve stem locates said valve member.

7. An excess flow check valve comprising a housing having a wide open passage therethrough and a valve seat spaced from and facing away from the outlet opening at one end of said passage and a shoulder adjacent to and facing towards the outlet opening of said passage,
   a comparatively strong compression spring resting on said shoulder with its outer end extending towards the outlet opening,
   a valve support stem disposed in said passage,
   means supporting the end of the valve support stem adjacent to said outlet opening upon said outer end of said spring,
   guide means supported on said shoulder at the other end of said spring engaging the valve support stem adjacent to the valve seat as the sole lateral support for axially guided reciprocable movement of said support stem in said passage,
   a valve member carried by said valve support stem and adapted to close against said valve seat,
   means interconnecting said support stem and valve member for closing said valve member against said valve seat when the support stem is moved by said compression spring towards said outlet end, and
   resilient means of less strength than said compression spring carried by said valve support stem between said guide means and valve member to urge said valve member away from said valve seat when free to do so.

8. The combination called for in claim 7 in which said guide means comprises a plurality of closely spaced smaller coils formed upon said compression spring at said other end thereof.

9. The combination called for in claim 7 wherein said valve member is slidably carried by said valve support stem with bleed passage clearance therebetween, and
   said interconnecting means includes an end stop element on the valve support stem, and
   valve means between said stop element and said valve member for sealing said bleed passage clearance when said valve member is held closed by said valve support stem.

10. An excess flow check valve comprising a housing having an open passage therethrough defining a surface of revolution including a valve seat defining a valve port at the inlet opening of said passage within an externally threaded portion of the body and facing away from an internally threaded outlet opening at the other end of said passage, said surface of revolution defining a shoulder adjacent to and facing towards the outlet opening of said passage,
    a comparatively strong coil compression spring within said threaded outlet opening resting on said shoulder with its outer extending towards the outlet opening,
    a valve support stem disposed axially in said passage,
    means supporting the end of the support stem adjacent to said outlet opening upon said outlet end of said spring,
    guide means supported at the other end of said spring extending towards said inlet opening and engaging the valve support stem adjacent to the valve seat as the lateral support for guided reciprocable movement of said support stem in said passage,
    a valve member slidably carried by said support stem and adapted to close against said valve seat,
    stop means interconnecting said support stem and valve member for closing said valve member against said valve seat when the support stem is moved by said compression spring towards said inlet end,
    retainer means on said valve support stem spaced from said valve member,
    resilient means of less strength than said compression spring interengaging said retainer means and valve member to urge said valve member away from said valve seat when free to do so.

11. The combination called for in claim 10 in which the difference between the square of the radii of said external thread and the valve member is substantially the same to less than the square of the radii of the valve port and the valve support stem at the valve port when the valve member is disposed in its open position.

12. An excess flow check valve comprising a housing having a wide open passage therethrough and a valve seat spaced from and facing away from the outlet opening at one end of said passage and a shoulder adjacent to and facing towards the outlet opening of said passage, retainer means reciprocably received in said outlet opening of said passage, a strong compression spring disposed between said retainer means and said shoulder for urging said retainer means towards said outlet opening, a valve support stem disposed in said passage, means interconnecting the retainer means, the outlet end of the valve support stem and the outlet end of said spring for axial movement of the valve support stem by the spring, guide means secured to the other end of said spring and engaging the valve support stem adjacent to the valve seat for reciprocable guided movement thereof in said passage, a valve member slidably carried by said valve support stem and adapted to close against said valve seat, a stop means interconnecting said valve support stem and valve member for closing said valve member against said seat when the valve support stem is moved towards said inlet end, and resilient means of less strength than said spring carried by said valve support stem engaging said guide means to urge said valve member away from said valve seat.

13. The combination called for in claim 12 in which said guide means comprises a plurality of closely spaced smaller coils formed as a continuation of said compression spring and extending from said shoulder towards said valve member.

References Cited

UNITED STATES PATENTS

| | | | |
|---|---|---|---|
| 2,886,061 | 5/1959 | Smith | 137—517 |
| 3,106,226 | 10/1963 | Machen | 137—517 XR |
| 3,310,064 | 3/1967 | Voos | 137—234.5 |

WILLIAM F. O'DEA, *Primary Examiner.*

W. H. WEAKLEY, *Assistant Examiner.*